United States Patent
Binkert

(10) Patent No.: US 12,188,505 B2
(45) Date of Patent: Jan. 7, 2025

(54) CONNECTOR FOR CONNECTING A COMPONENT WITH A BOLT AND SYSTEM WITH A BOLT AND SUCH A CONNECTOR AND METHOD FOR PRODUCING SUCH A SYSTEM

(71) Applicant: A. RAYMOND ET CIE SCS, Grenoble (FR)

(72) Inventor: Sven Binkert, Lörrach (DE)

(73) Assignee: A. RAYMOND ET CIE, Grenoble (FR)

( * ) Notice: Subject to any disclaimer, the term of this patent is extended or adjusted under 35 U.S.C. 154(b) by 756 days.

(21) Appl. No.: 17/388,718

(22) Filed: Jul. 29, 2021

(65) Prior Publication Data
US 2022/0034340 A1    Feb. 3, 2022

(30) Foreign Application Priority Data

Jul. 30, 2020    (DE) .......................... 102020004640.1

(51) Int. Cl.
*F16B 2/04*    (2006.01)

(52) U.S. Cl.
CPC ..................... *F16B 2/04* (2013.01)

(58) Field of Classification Search
CPC ............................. F16B 2/243; F16B 37/0857
See application file for complete search history.

(56) References Cited

U.S. PATENT DOCUMENTS

| | | | | |
|---|---|---|---|---|
| 7,374,200 | B2 * | 5/2008 | Ikeda | F16B 21/075 280/730.2 |
| 8,950,043 | B2 * | 2/2015 | Hofmann | F16B 5/065 24/297 |
| 9,086,086 | B2 * | 7/2015 | Bentrim | F16B 21/02 |
| 10,443,633 | B2 * | 10/2019 | Scherer | F16B 21/086 |
| 10,465,727 | B2 * | 11/2019 | Schulz | F16B 43/009 |
| 11,041,520 | B2 * | 6/2021 | Sbongk | B60R 13/0243 |
| 11,261,898 | B2 * | 3/2022 | Ammann | F16B 21/086 |

(Continued)

FOREIGN PATENT DOCUMENTS

| | | | |
|---|---|---|---|
| DE | 19829262 | A1 | 1/2000 |
| DE | 102009024983 | A1 | 12/2010 |
| GB | 2234720 | A * | 2/1991 ............. B60K 11/04 |

OTHER PUBLICATIONS

Machine assisted English translation of DE19829262A1 obtained from https://patents.google.com/patent on Jul. 22, 2021, 5 pages.

*Primary Examiner* — Matthew R McMahon
(74) *Attorney, Agent, or Firm* — WARNER NORCROSS + JUDD LLP

(57) ABSTRACT

A connector for connecting a component to a bolt has a base part and at least one holding part arranged displaceably on the base part. The base part has a connecting section for connecting to the component, a receptacle for receiving the bolt, and a clamping element which partially delimits the receptacle. The clamping element, in a delivery state of the connector, in which the bolt has not yet been inserted into the receptacle, assumes a first position and can be moved outward into a second position. The holding part has a first holding lug, which in the delivery state is arranged in a first latching recess of the base part or in the delivery state is arranged at a distance from the first latching recess of the base part.

10 Claims, 22 Drawing Sheets

(56) References Cited

U.S. PATENT DOCUMENTS

| | | | | |
|---|---|---|---|---|
| 11,639,731 B2* | 5/2023 | Murphy | ............... | F16B 21/075 |
| | | | | 280/728.1 |
| 11,835,075 B2* | 12/2023 | Mutz | ................... | F16B 21/086 |
| 2008/0260490 A1* | 10/2008 | Motsch | ................ | F16B 37/043 |
| | | | | 411/183 |
| 2009/0169326 A1* | 7/2009 | Hullmann | ............ | F16B 5/0621 |
| | | | | 411/103 |
| 2012/0131771 A1 | 5/2012 | Hofmann et al. | | |
| 2016/0115979 A1* | 4/2016 | Kwon | .................... | E05B 85/12 |
| | | | | 248/220.31 |
| 2016/0115987 A1* | 4/2016 | Kwon | .................... | E05B 79/06 |
| | | | | 248/27.3 |

* cited by examiner

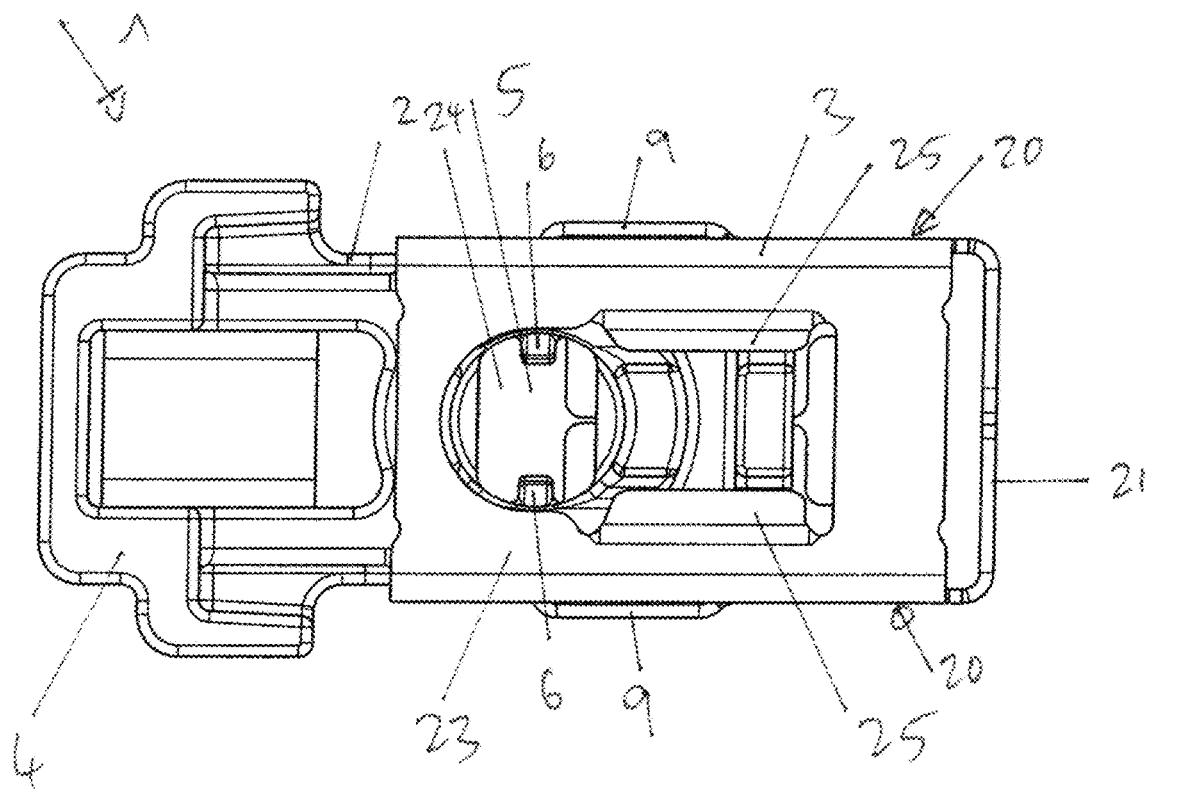

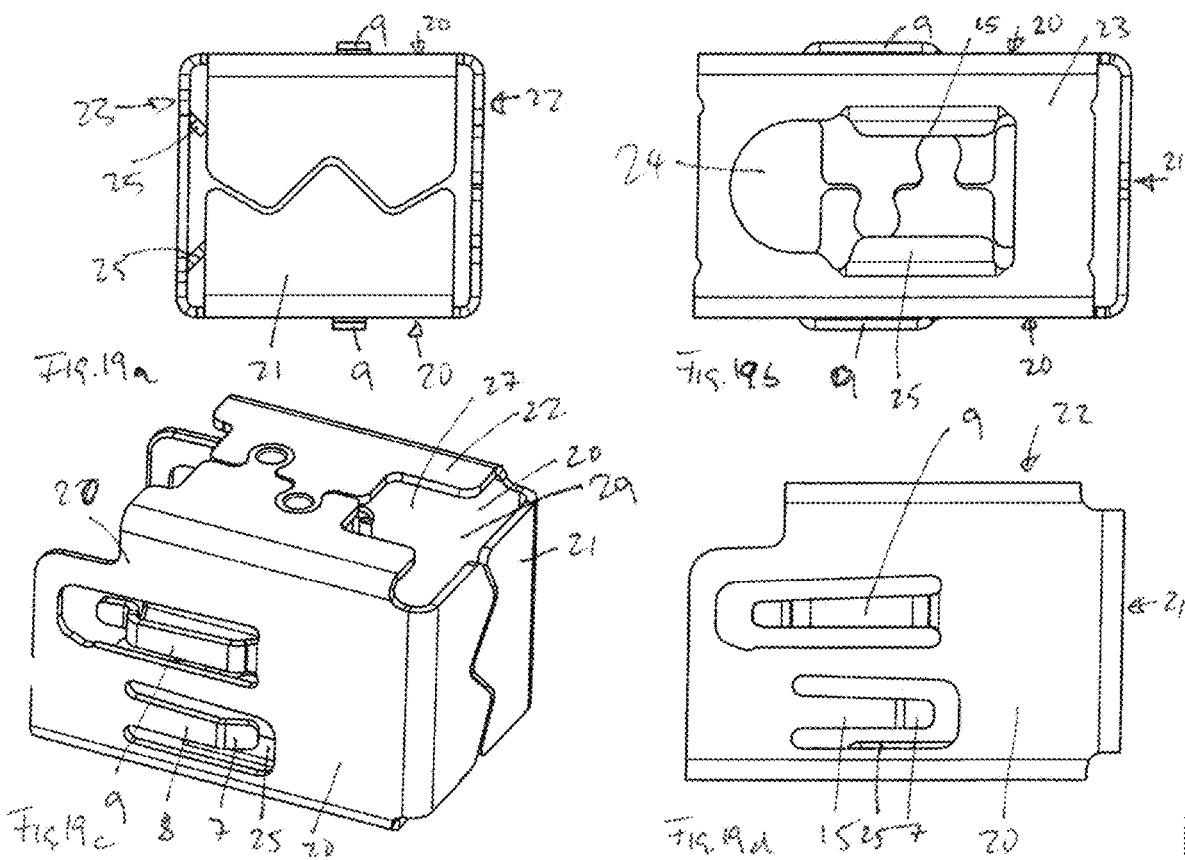

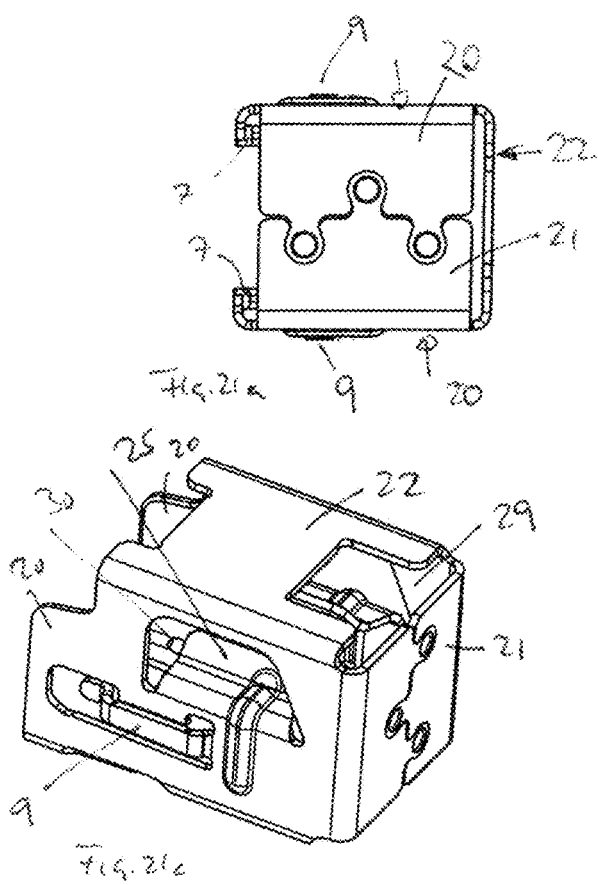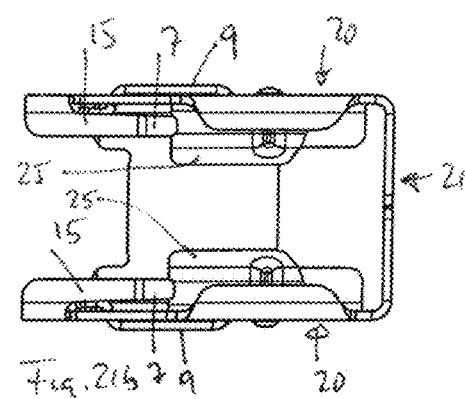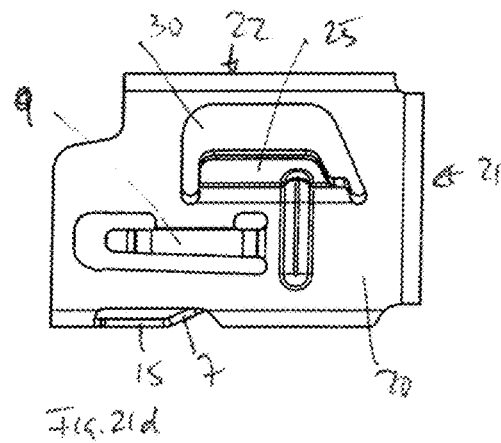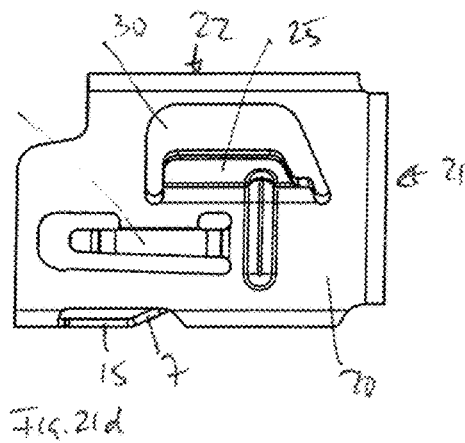

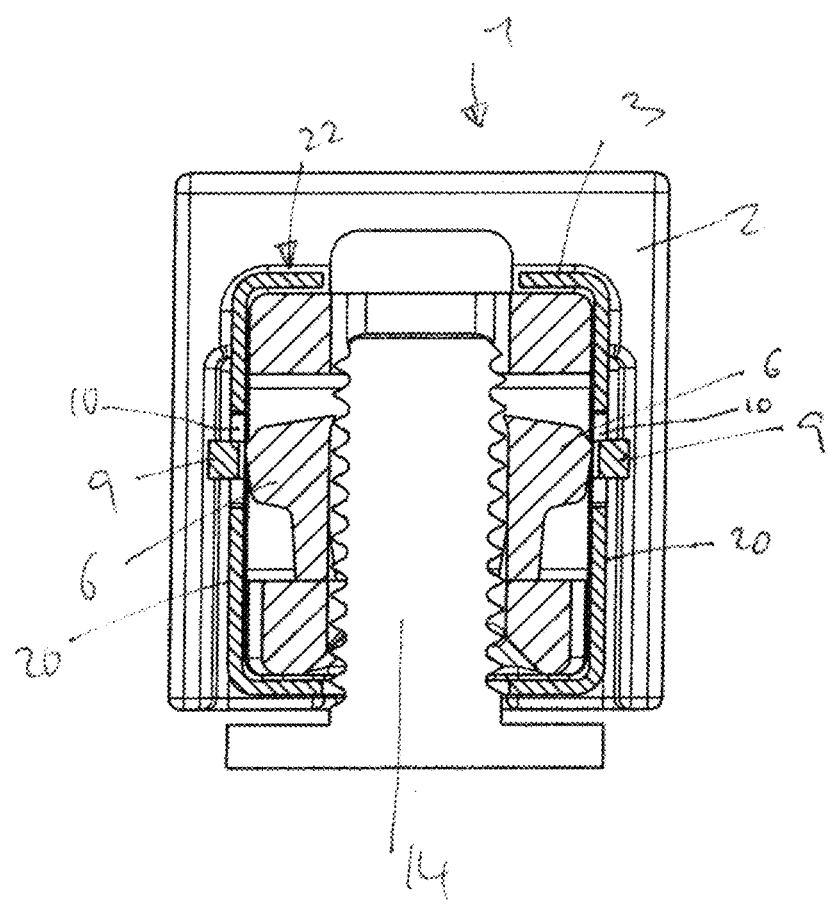

CONNECTOR FOR CONNECTING A COMPONENT WITH A BOLT AND SYSTEM WITH A BOLT AND SUCH A CONNECTOR AND METHOD FOR PRODUCING SUCH A SYSTEM

CROSS-REFERENCE TO RELATED APPLICATIONS

This application claims priority to and all advantages of German Patent Application No. 102020004640.1, filed on 30 Jul. 2020, which is incorporated by reference herein.

FIELD OF THE INVENTION

The invention relates to a connector for connecting a component to a bolt. The invention further relates to a system having a bolt and such a connector. The invention also relates to a method for producing such a system.

BACKGROUND

The connection of components to a bolt by means of connectors is known in practice. Frequently, a bolt, usually a threaded bolt, protrudes from a first component. A second component is to be fastened to this first component in that a connector is arranged between the bolt and the component to be connected. The connector is connected on the one hand to the bolt and on the other hand to the component to be connected to the bolt. Such connectors are often used for fastening cables, lines or hoses, or integrated into plastic components, for example into cable ducts, line holders, etc., in order to be able to fasten to other components.

Against this background, the invention is based on the object of proposing a connector for connecting a component to a bolt, by means of which the connection can be easily produced and which enables a stable connection. Furthermore, a system based on such a connector and a method for producing such a system are to be proposed.

BRIEF SUMMARY

Disclosed is a connector which typically has several parts, for example two parts. In a specific embodiment, the connector has a base part and at least one holding part displaceably arranged on the base part.

The base part belonging to the connector according to the invention has a connecting section for connecting to the component. The connecting section can be shaped in such a way that a part of the component can be supported on the connecting section. For example, the connecting section can have a support surface on which the component, for example a cable assembly or a line, can be placed. It is also conceivable for the connecting section to have a recess through which a cable binder or the like can be guided. Embodiments are also possible in which the connecting section is part of the component, i.e., for example, in the case of a cable duct that is produced as part of the plastic forming the cable duct.

Furthermore, the base part has a receptacle for receiving the bolt. In this case, the base part has a clamping element which partially delimits the receptacle, wherein the clamping element assumes a first position in a delivery state of the connector in which the bolt has not yet been inserted into the receptacle and can be moved outward into a second position.

In certain embodiments, the clamping part is designed like a wing which can pivot about a pivot axis from the first position outwards into the second position.

In certain embodiments, a second clamping element is provided opposite the clamping element and also partially delimits the receptacle, wherein the second clamping element likewise assumes a first position in a delivery state of the connector in which the bolt has not yet been inserted into the receptacle and can be moved outward into a second position. In this case, it is typical that the movement from the first position to the second position takes place with the second clamping element in the opposite direction to the movement of the first clamping element from the first position to the second position.

In the system according to the invention, the receptacle and the arrangement of the clamping element in the delivery state are adapted to the size of the bolt in such a way that the receptacle with the clamping element arranged in the first position is smaller than the size of the bolt and that the insertion of the bolt into the receptacle results in the clamping element being moved outward into the second position in order to make room for the bolt.

Embodiments are possible in which the clamping element has a surface design on its surface pointing into the interior of the receptacle, which surface interacts with a specific shape of the bolt. For example, on this internally facing surface, the clamping element can have parts of threads with which the clamping element could interact with a bolt with external threads. It is also conceivable for the inwardly facing surface of the clamping element to be a partial surface of a ball when the bolt is a ball bolt. In certain embodiments, however, the clamping element has an inwardly facing smooth surface which is provided for interacting with the bolt and is itself suitable for interacting with a threaded bolt, since the smooth inner surface of the clamping element can interact with the tips of the threads of a bolt with external threads. A clamping element with a smooth inner surface can be produced with particularly ease.

The connector according to the invention also has a holding part. The holding part has a first holding lug. In the delivery state of the connector, in which the bolt has not yet been inserted into the receptacle, the retaining lug according to a first embodiment can be arranged in a first latching recess of the base part. In a second embodiment, it is possible that although the retaining lug is not yet arranged in a first latching recess of the base part and is arranged at a distance from the first latching recess of the base part, it can be brought into the first latching recess by a relative movement in a first direction between the holding part and the base part. The arrangement of the retaining lug in the first latching recess blocks a relative movement between the holding part and the base part in the first direction. The arrangement of the retaining lug in the first latching recess prevents the holding part from being pulled in the first direction and being pulled off the base part.

The holding part furthermore comprises a spring arm. In the delivery state, in which the bolt has not yet been inserted into the receptacle, the spring arm engages in a delivery recess in a first embodiment. In a second embodiment, in the delivery state, the spring arm does not yet engage in the delivery recess but can be brought into engagement with the delivery recess by a relative movement in a second direction, opposite to the first direction between the holding part and the base part.

The delivery recess has a wall. The spring arm can come into contact with the wall when it engages with the delivery recess. A contact between the spring arm and the wall blocks a relative movement between the holding part and the base parts in the second direction. The abutment of the spring arm with the wall prevents the holding part from being pushed further into the second direction onto the base part.

The interaction of the first retaining lug with the first latching recess and the interaction of the spring arm with the delivery recess maintain the holding part within a certain range, which is fixed on the base part by the relative position of the delivery recess with respect to the latching recess and by the real position of the first retaining lug with respect to the spring arm. Embodiments are conceivable in which, in the delivery state, the first retaining lug engages in the first latching recess and the spring arm engages in the delivery recess and comes into abutment with the wall. In such an embodiment, the position of the holding part relative to the base part would be unambiguously fixed in the delivery state. In other embodiments, a slight relative movement of the holding part relative to the base part would be possible, wherein the respective movement in the respective direction would be limited by the then engaging of the first retaining lug in the first latching recess on the one hand or the abutment of the spring arm on the wall on the other hand.

According to the invention, it is now provided that the clamping element comes into contact with the spring arm from the inside when moving from the first position into the second position when the spring arm is in engagement with the delivery recess, and the spring arm is not in engagement with the delivery recess when the clamping element is in the second position. This makes it possible to move the holding part relative to the base part in the second direction.

The connector according to the invention thus uses the clamping element of the base part that is movable between a first position and a second position in order to lift the position of the holding part relative to the base part by fixing the position of the holding part resulting from the engagement of the spring arm in the delivery recess. If the bolt is inserted into the receptacle and the clamping element is thus moved outwards from the first position into the second position, the spring arm is disengaged from the delivery recess according to the invention. This simultaneously makes it possible to move the holding part relative to the base part in the second direction, i.e., to push the holding part further onto the base part. This creates the possibility that the holding part is held captive on the base part when the connector according to the invention is in the delivery state. By simply placing the connector on the bolt, the possibility of sliding the holding part further onto the base part is then easily created.

In certain embodiments, the base part and the holding part are designed symmetrically with respect to a plane with respect to the arrangement of the retaining lug, the latching recess, the delivery recess and the spring arm. In certain embodiments, the first retaining lug and the first latching recess and a spring arm and a delivery recess are arranged on one side of the plane, and a second retaining lug with a second latching recess associated therewith and a further spring arm and a further delivery recess associated therewith are arranged on the other side of the plane. In certain embodiments, the first and the second directions as well as the insertion direction of the bolt into the receptacle are arranged in this plane.

In certain embodiments, the connector according to the invention has a locking state. In order to achieve the locking state, the holding part must be moved in the direction of the second direction relative to the base part from the delivery state. In certain embodiments, it can be provided that, in the locking state, the first retaining lug of the holding part is arranged in a second latching recess of the base part, wherein the arrangement of the first retaining lug in the second latching recess blocks a relative movement between the holding part and the base part in the first direction. This prevents the holding part from being pulled from the base part in the first direction when the connector according to the invention is in the locking state.

Additionally or alternatively, an embodiment is possible in which, in the locking state, a second retaining lug is provided on the holding part, which retaining lug is arranged in the second latching recess of the base part in the locking state, wherein the arrangement of the second retaining lug in the second latching recess blocks a relative movement between the holding part and the base part in the first direction. If both the first retaining lug and the second retaining lug are used to prevent the holding part from being pulled off from the base part in the first direction, particularly high holding forces can thereby be produced. Given a combination of the first holding lug, which would only be used to prevent the holding part from pulling off from the base part in the delivery state, with a second holding lug, which engages in a second latching recess associated therewith in the locking state and can absorb higher holding forces, if an embodiment were created in which the first retaining lug can be designed simply and only assumes the task of a distributor securing device, while the second retaining lug can be designed to absorb high holding forces. In one embodiment in which the first retaining lug is used both as a distributor securing device in the delivery state and as a pull-off securing device in the locking state, the holding part can be designed particularly simply because it may be sufficient to provide only a first retaining lug or only a first retaining lug on one side of the plane in combination with a second retaining lug on the other side of the plane.

In certain embodiments, it is furthermore conceivable for the spring arm to engage in a locking recess of the base part in the locking state. In this way, the holding forces that prevent the holding part from pulling off from the base part could be once more increased. Alternatively, the engagement of the spring arm in the locking recess can be used to prevent the holding part from being pushed further onto the base part than the locking state. However, embodiments in which, in the locking state, the spring arm does not engage in a locking recess and, for example, projects outwards on the base part or is brought into smooth contact with the base part by an external deformation step are also conceivable.

In certain embodiments, the holding part has an engagement tab which, in the locking state, projects into the receptacle or partially closes an opening to which the receptacle adjoins. This engagement tab can be used to engage in a thread path of a bolt designed as a threaded bolt. The interaction between the engagement tab and the bolt can prevent the bolt from being pulled out of the receptacle.

In certain embodiments, the holding part has a lower opening which, in the delivered state, is in alignment with the recess and allows the bolt to be pushed in. In certain embodiments, the engagement tab is arranged downstream of the lower opening in the direction of the first direction. If the holding part is brought into the locking state from the delivery state, in which the lower opening is in alignment with the recess, in the direction of the second direction, the lower opening is brought out of alignment with the recess and the engagement tab partially closes off the opening to which the receptacle adjoins. In this case, the engagement tab in the system according to the invention engages with a thread of a bolt designed as a threaded bolt.

In an alternative embodiment, the base section has a window leading from an outer surface of the base section to the receptacle. In certain embodiments, the holding part has an engagement tab which engages through the window and projects into the receptacle in the locked state. This engagement tab can be used to engage in a thread path of a bolt designed as a threaded bolt. The interaction between the engagement tab and the bolt can prevent the bolt from being pulled out of the receptacle.

In certain embodiments, the connector according to the invention has an installation area on the base part. In certain embodiments, the installation detection surface in the delivered state is covered by the holding part. Due to the fact that the relative position of the holding part relative to the base part in the delivery state is set on a specific range, it is possible to cover the installation detection surface in the delivery state by the holding part. In certain embodiments, the installation detection surface in the locking state is not covered by the holding part. The installation detection surface can contain, for example, a QR code or another graphical design. The installation detection surface allows the user of the connector according to the invention to indicate that the holding part has reached its relative position relative to the base part associated with the locking state and that the connection of the connector according to the invention to the bolt has thus been successfully brought about.

In certain embodiments, the holding part has a window. In certain embodiments, the window in the locking state is in alignment with the installation detection surface of the base part.

In certain embodiments, the base part is a plastic component. The holding part can be a metal part, in particular a metal part produced from a metal sheet section by means of bending and punching. The holding part can also be a plastic part.

In certain embodiments, the base part has a holding part section which is cuboid in cross-section and in which the receptacle is arranged. In specific embodiments, the holding part is cuboid in shape.

In certain embodiments, the base part has guide surfaces and the holding part has mating surfaces which can come into contact with the guide surfaces, wherein the holding part is guided by the contact of the mating surface with the guide surface when the holding part is moved from the delivery state into the locked state when the holding part is moved from the delivery state into the locked state.

In certain embodiments, the spring arm runs parallel to the first direction and parallel to the second direction. In certain embodiments, the first retaining lug is designed at the end of another spring arm. In certain embodiments, the further spring arm runs parallel to the first direction and parallel to the second direction.

In certain embodiments, the spring arm is provided as a punching section in a side surface of the holding part, preferably in a side surface of a cuboid holding part. In certain embodiments, the further spring arm, on which the first retaining lug is designed, is provided as a punching section in a side surface of the holding part, preferably in a side surface of a cuboid holding part, preferably in the same side surface in which the spring arm is designed as a punching section.

In certain embodiments, the spring arm is designed as a punching section in a side surface of the holding part and extends from a foot section at which the spring arm merges into the parts of the side surface surrounding it to a free end section. The end section is preferably provided for abutment with the wall. In certain embodiments, the continuation of the spring arm, in which the first retaining lug is designed, is designed as a punching section in a side surface of the holding part and extends from a foot section at which the spring arm merges into the parts of the side surface surrounding it to a free end section. The end section is preferably provided for engaging in the first latching recess. In certain embodiments—in relation to the arrangement in the direction of the second direction—the foot section of the first spring arm is arranged in the region of the end section of the additional spring arm and/or the end section of the spring arm is arranged in the region of the foot section of the additional spring arm.

In certain embodiments, the first retaining lug is an inwardly facing end section of a spring arm running at an angle to the first direction. In which the first retaining lug is designed facing inward, it can engage deeply in the first latching recess and thereby effectively prevent a relative movement between the holding part and the base part in the first direction.

The system according to the invention has a bolt and a connector according to the invention, wherein the bolt is at least partially in the receptacle and the holding part is in the locking state.

In certain embodiments, the bolt is a pin with an external thread. In an alternative embodiment, the bolt has a ball which comes into contact with the clamping elements when the bolt is in the receptacle.

The method according to the invention for generating the system according to the invention provides that
a connector according to the invention is provided, wherein the spring arm engages with the delivery recess,
the bolt is inserted into the receptacle, wherein the insertion of the bolt into the receptacle causes the clamping element to be moved from the first position in the direction of the second position,
wherein the movement of the clamping element from the first position in the direction of the second position causes the clamping element to come into contact with the spring arm and, when the movement in the direction of the second position continues, presses the spring arm out of the delivery recess,
the holding part is moved relative to the base part in the second direction when the spring arm has left the delivery receptacle.

In certain embodiments, the holding part latches with the bolt and/or engages with the bolt.

In certain embodiments of the method, the connector has an installation detection surface on the base part, wherein the installation detection surface is covered by the holding part in the delivery state and is not covered by the holding part in the locking state. In certain embodiments, the method according to the invention includes examining whether the installation detection surface is not covered by the holding part.

BRIEF DESCRIPTION OF THE DRAWINGS

The invention will be explained below with reference to drawings illustrating only embodiments of the invention. The following are shown in the drawing:

FIG. 17 shows a schematic view from below of the connector according to FIG. 1;

FIG. 21 a, b, c, d show schematic views of the holding part of the connector according to FIG. 9; and FIG. 22 shows the sectional view through the connector according to FIG. 4 with bolts inserted into the receptacle

DETAILED DESCRIPTION

Figure 1:
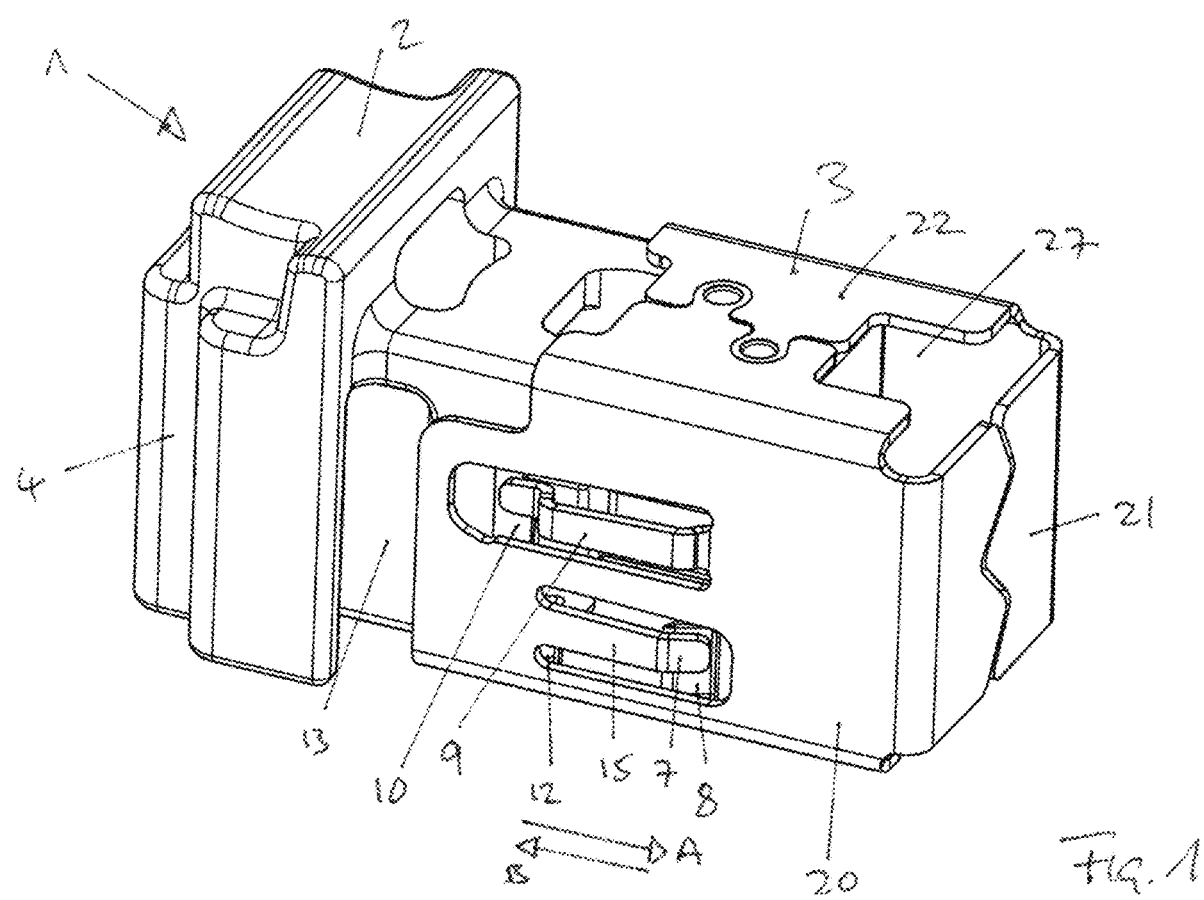
FIG. 1 shows a schematic, perspective view of a connector according to the invention in accordance with a first embodiment in the delivery state.
Figure 2:
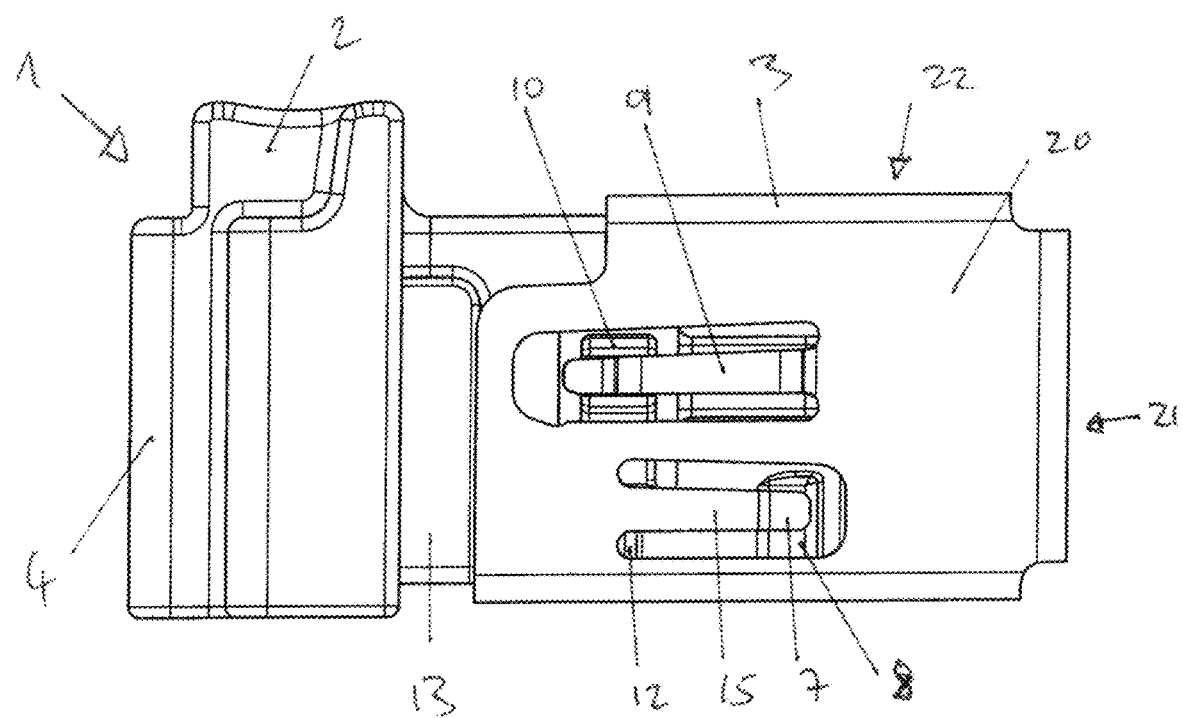
FIG. 2 shows a schematic side view of the connector according to FIG. 1.
Figure 3:
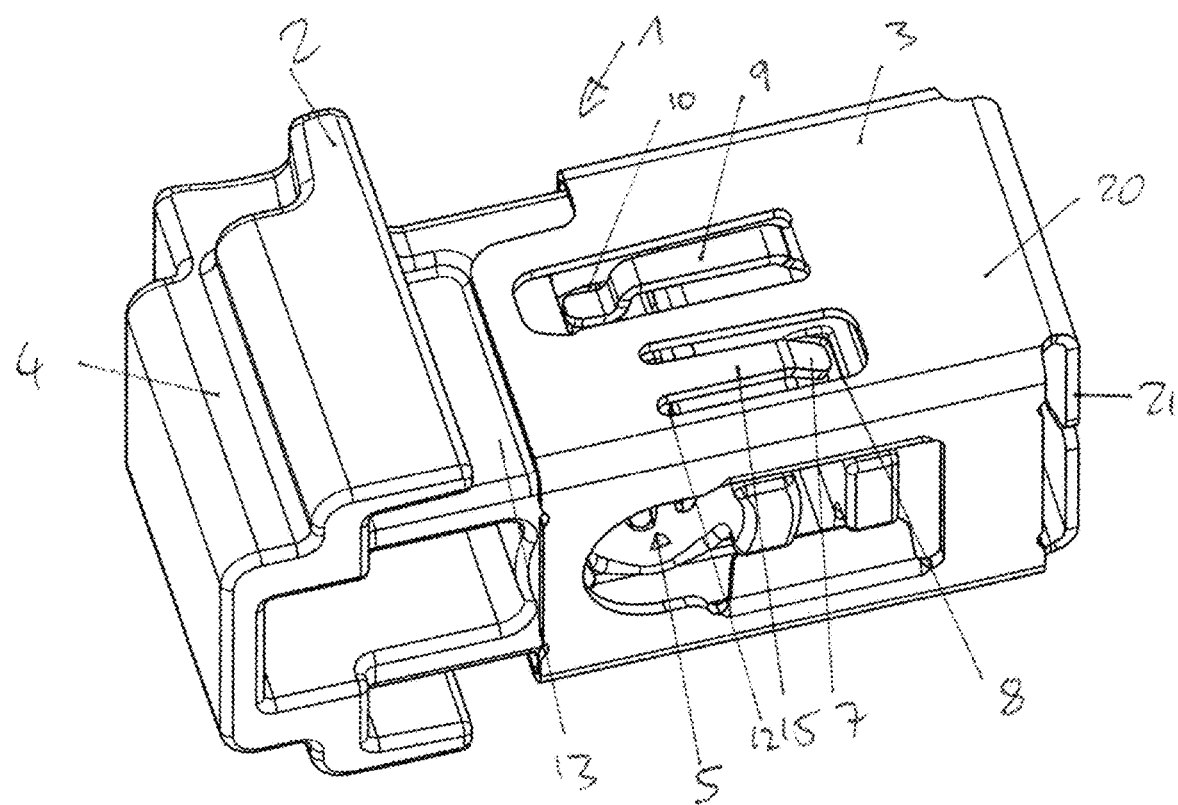
FIG. 3 shows a schematic, perspective view of the connector according to FIG. 1.
Figure 4:
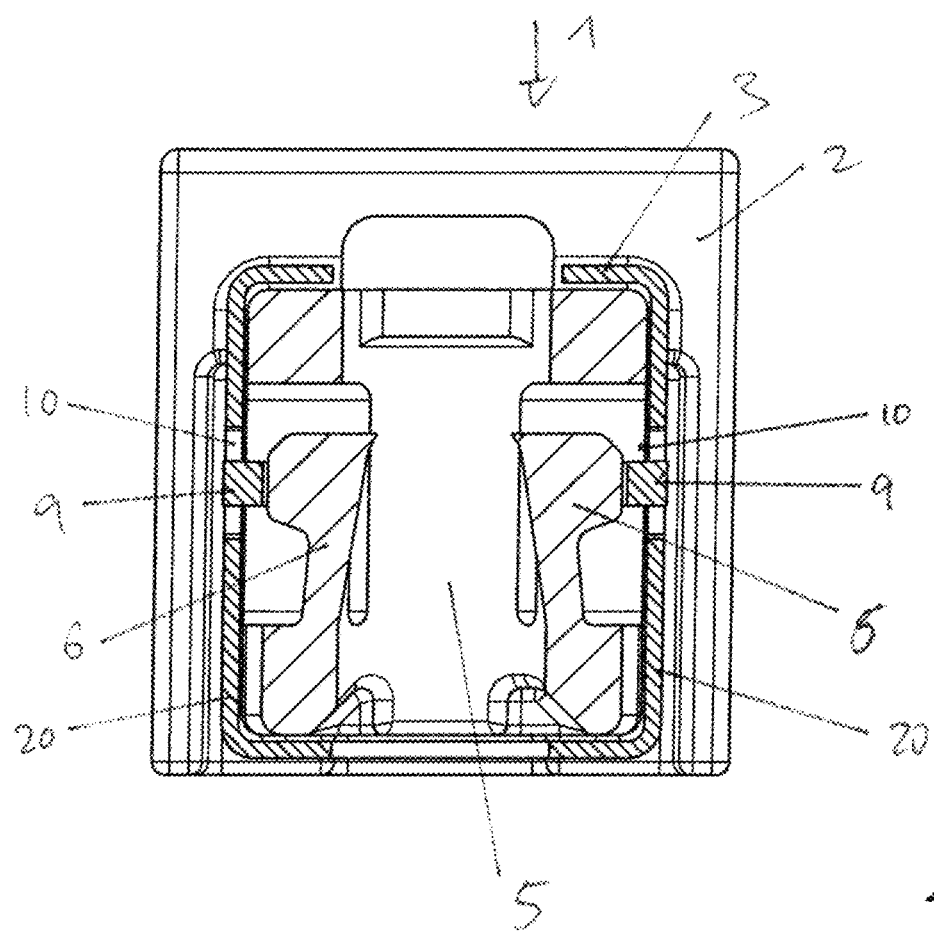
FIG. 4 shows a sectional view through the connector according to FIG. 1.
Figure 5:
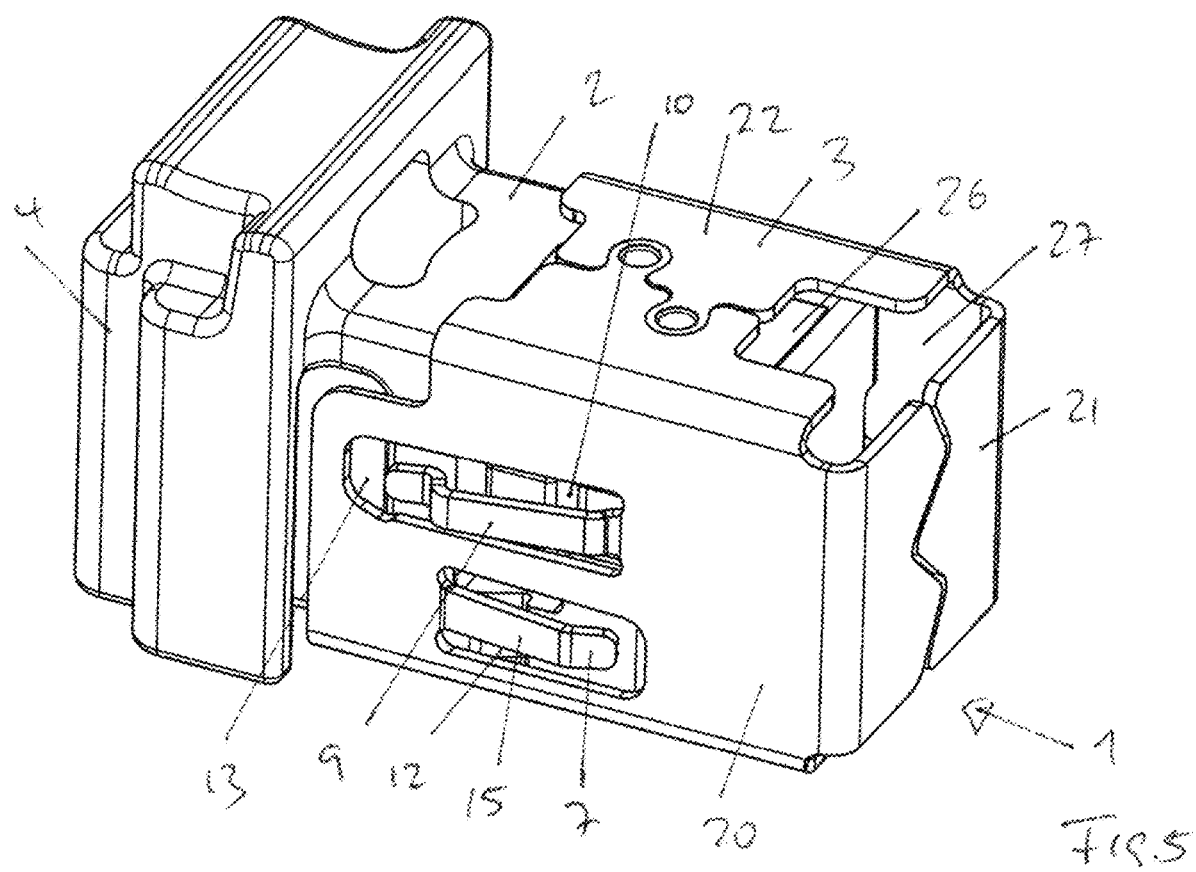
FIG. 5 shows a schematic, perspective view of the connector according to FIG. 1, wherein the holding part has already been displaced somewhat in the second direction.

FIG. 1 shows the connector 1 according to the invention for connecting a component (not shown) to a bolt 14 (not shown in FIGS. 1 to 3 but shown in FIGS. 4 and 5). The connector 1 is multi-part, namely two-part. It has a base part 2 and a holding part 3. The holding part 3 is displaceably arranged on the base part 2.

The base part 2 has a connecting section 4 for connecting the connector 1 to the component. Furthermore, the base part 2 has a receptacle 5 for receiving a bolt 14.

The base part 2 has two clamping elements 6 which each partially delimit the receptacle 5 and are arranged opposite each other. In the delivery state shown in FIG. 4, the two clamping elements 6 have a first position in which the bolt 14 has not yet been inserted into the receptacle 5. In this first position, the clamping elements 6 project further into the receptacle 5. Furthermore, the clamping elements 6 have a second position in FIG. 22, in which the clamping elements 6 were moved outward in relation to the first position.

The connector 1 has a holding part 3 in addition to the base part 2. The holding part 3 has a first holding lug 7. In the delivery state of the connector 1 shown in FIGS. 1 to 3, the first retaining lug 7 is arranged in a first latching recess 8. The arrangement of the first retaining lug 7 in the first latching recess 8 blocks a relative movement between the holding part 3 and the base part 2 in the first direction, which is shown in FIG. 1 by the arrow A. The arrangement of the retaining lug 7 in the first latching recess 8 blocks a removal of the holding part 3 from the base part 2 in this first direction A. The first retaining lug 7 is designed on a spring arm, which is part of the holding part 3.

The holding part 3 has a spring arm 9. The spring arm 9 engages in a delivery recess 10 of the component 2 shown in FIG. 1. The delivery recess 10 has a wall 11. If the spring arm engages with the delivery recess 10, the spring arm 9 can come into abutment with the wall 11. Contact between the spring arm 9 and the wall 11 blocks a relative movement between the holding part 3 and the base part 2 in the second direction shown by the arrow B in FIG. 1. Contact of the spring arm 9 with the wall 11 prevents the holding part 3 from being pushed further onto the base part 2.

When moving from the first position into the second position, the clamping element 6 comes into contact with the spring arm 9 from the inside when the spring arm 9 is in engagement with the delivery recess 10. When the clamping element 6 is in the second position, the spring arm 9 is not engaged with the delivery recess 10. When moved from the first position, the clamping element 6 has pushed out the spring element 9 from the inside out of the delivery recess 10. Since the spring element 9 is now no longer engaged with the delivery recess 10, the blocking of the relative movement between the holding part 3 and the base part 2 is lifted in the second direction B and the holding part 3 can be pushed further onto the base part 2.

Figure 6:
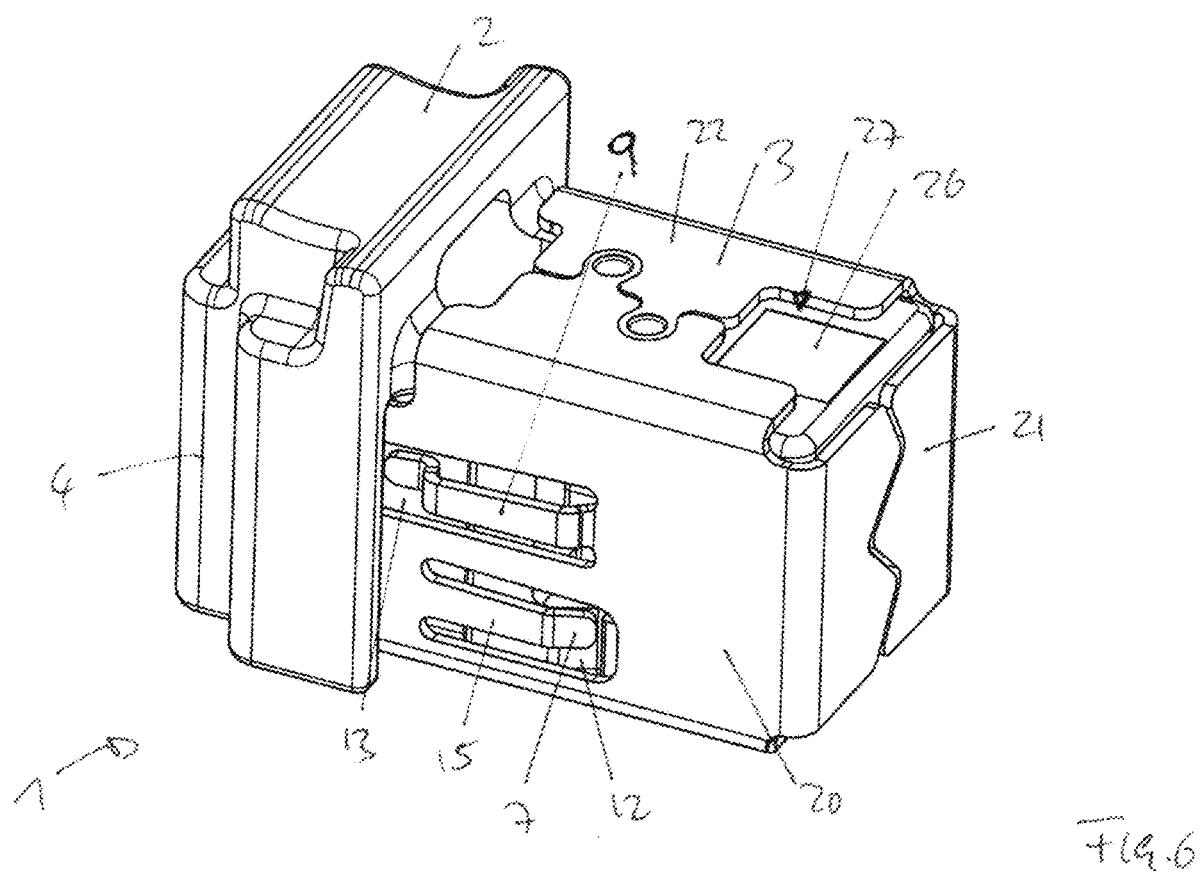
FIG. 6 shows a schematic, perspective view of the connector according to the invention according to FIG. 1 in the locking state.
Figure 7:
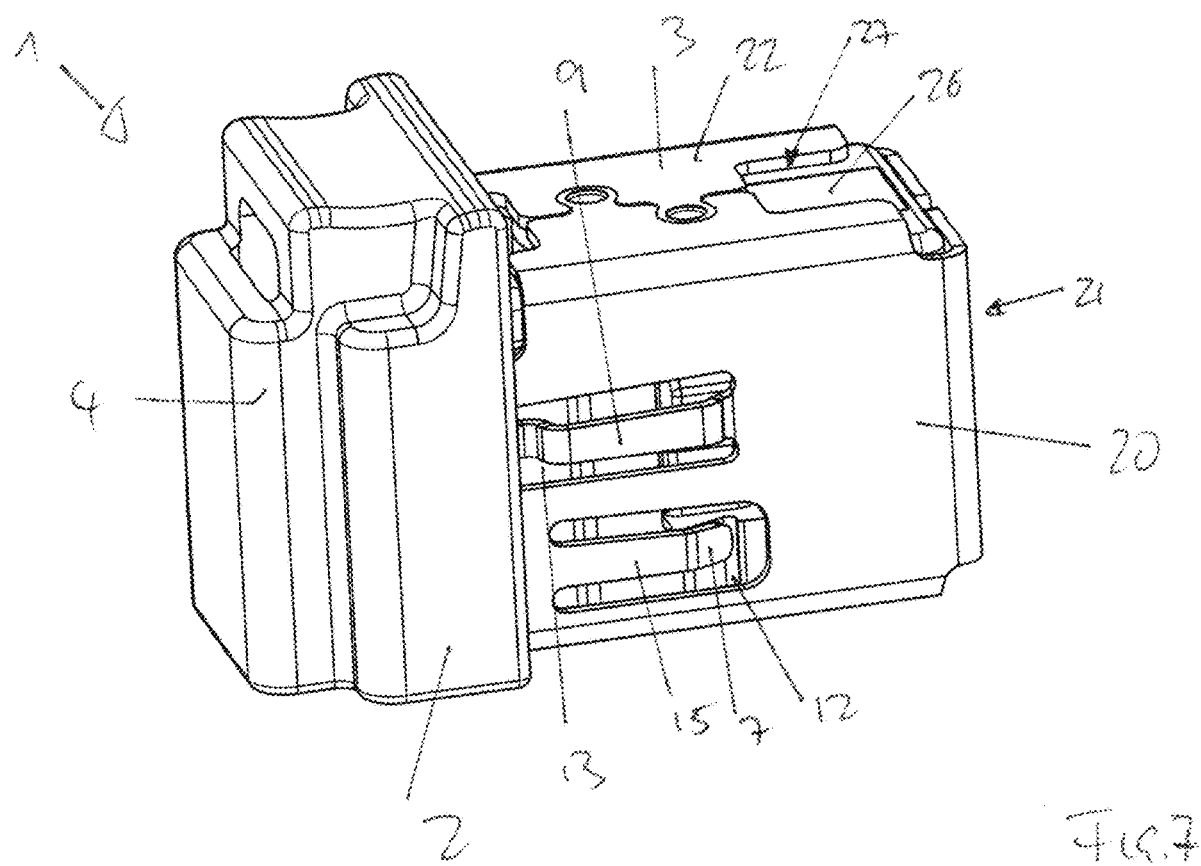
FIG. 7 shows a schematic, perspective view of the connector according to FIG. 6.
Figure 8:
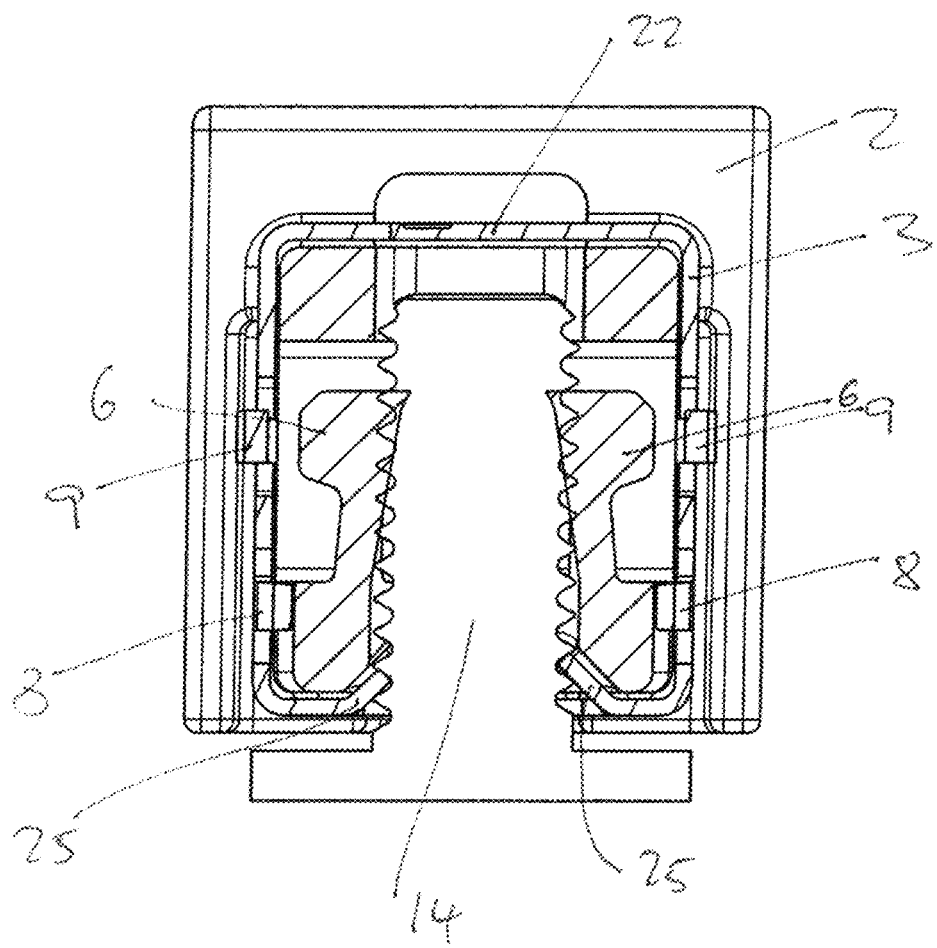
FIG. 8 shows a sectional view through the connector according to FIG. 6.
Figure 9:
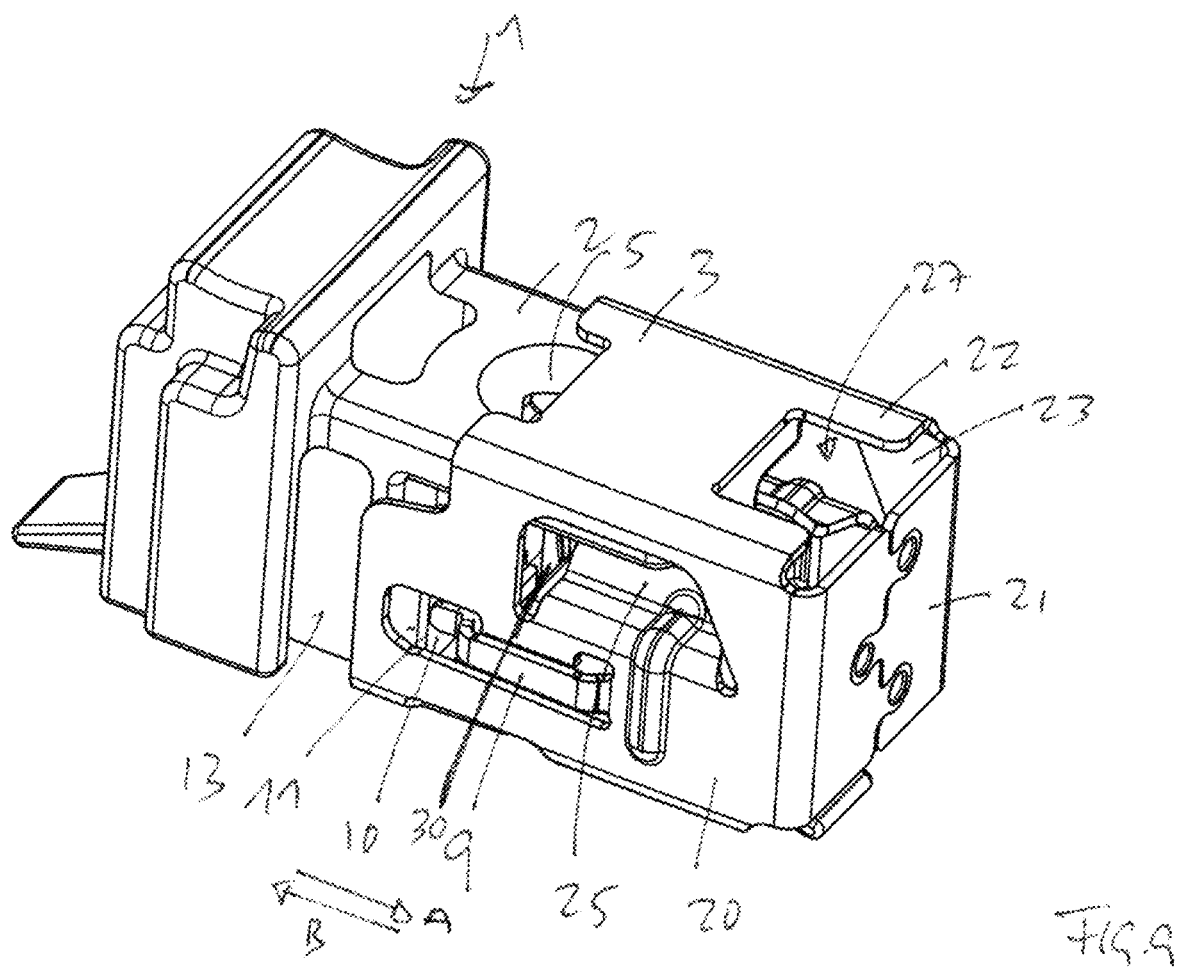
FIG. 9 shows a schematic, perspective view of a connector according to the invention in accordance with a second embodiment in the delivery state.
Figure 10:
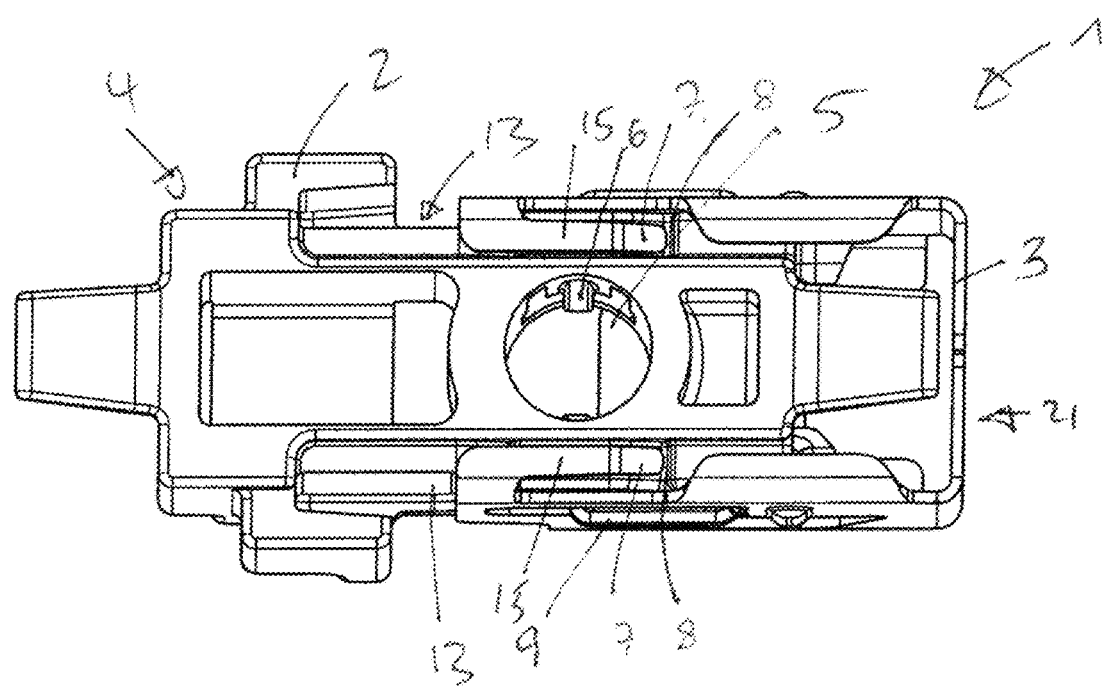
FIG. 10 shows a schematic bottom view of the connector according to FIG. 9.
Figure 11:
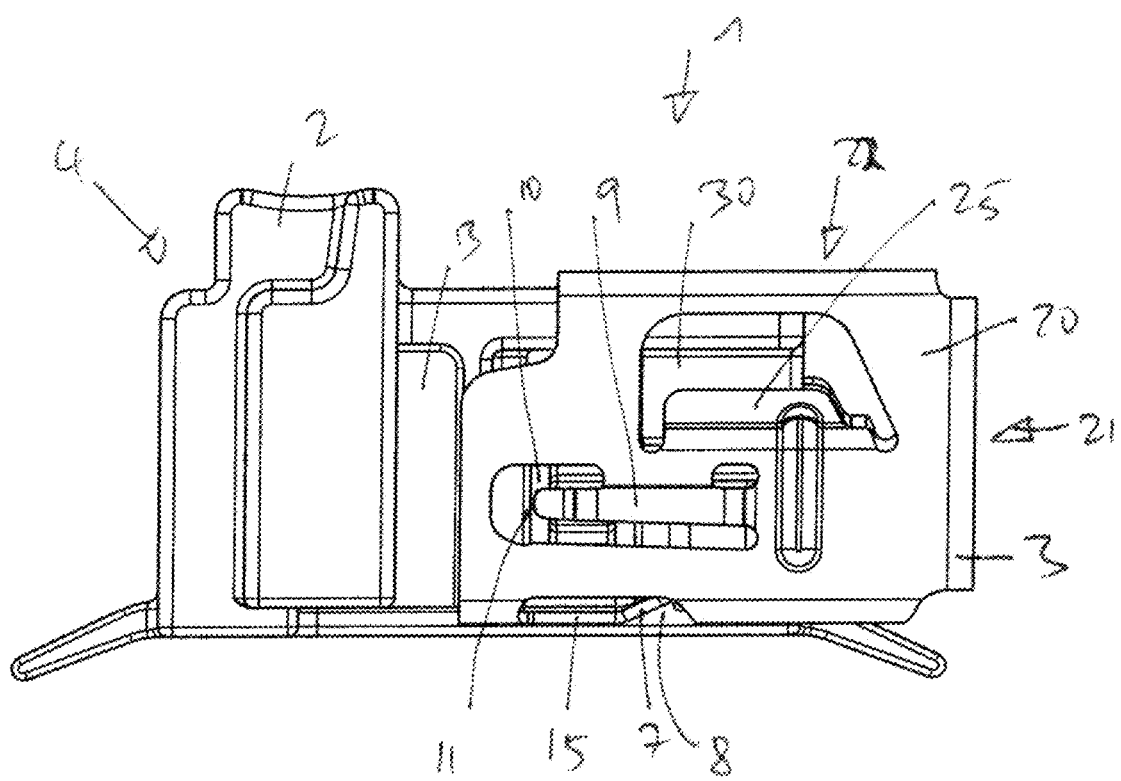
FIG. 11 shows a schematic side view of the connector according to FIG. 9.
Figure 12:
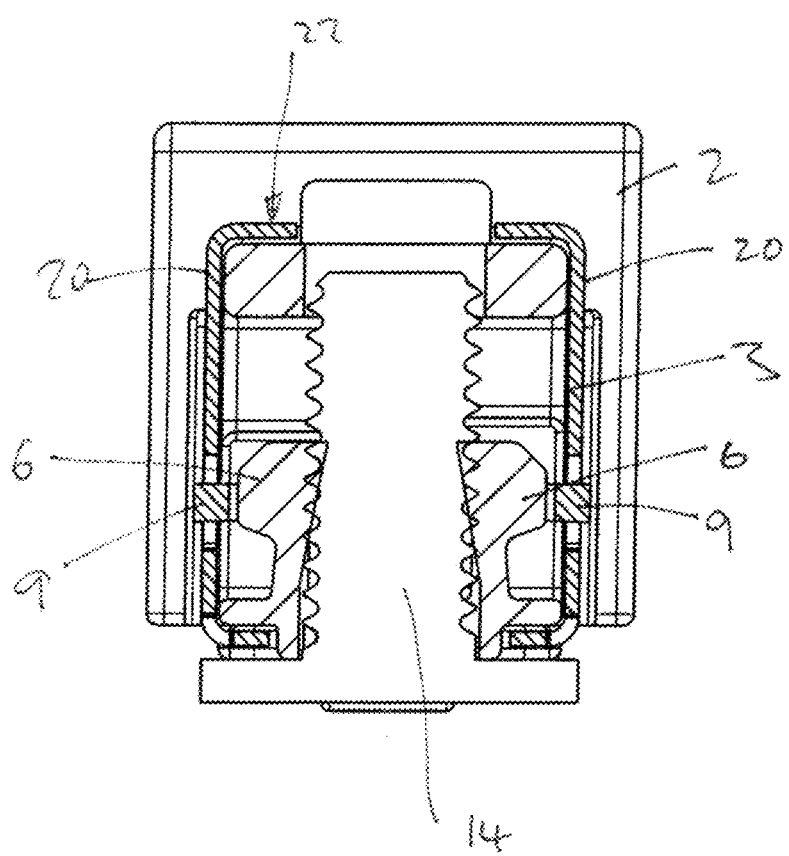
FIG. 12 shows a sectional view through the connector according to FIG. 9.
Figure 13:
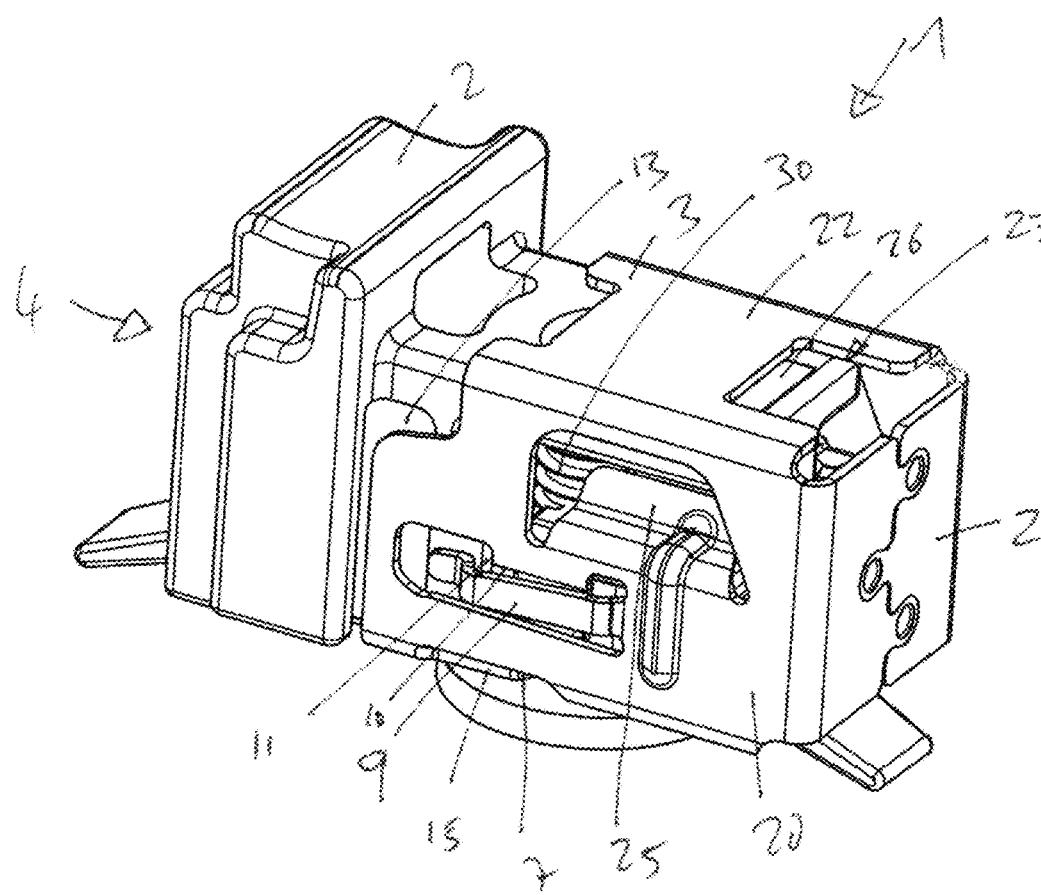
FIG. 13 shows a schematic, perspective view of the connector according to FIG. 9, wherein the holding part has already been displaced somewhat in the second direction.

The connector 1 according to the invention has a locking state shown in FIGS. 6, 7, 8. In order to achieve the locking state, the holding part 3 must be moved relative to the base part 2 from the delivery state (cf. FIGS. 1 to 5) in the direction of the second direction B.

In the embodiment shown in FIGS. 1 to 8, the first retaining lug 7 of the holding part 3 is arranged in a second latching recess 12 in the locking state. The arrangement of the first retaining lug 7 in the second latching recess 12 blocks a relative movement between the holding part 3 and the base part 2 in the first direction A.

In the exemplary embodiment shown in FIGS. 1 to 8, 17, 18a, 18b, 18c, 18d, 19a, 19b, 19c, 19d, 22, the spring arm 9 engages in a locking recess 13 of the component 2 in the locking state.

In the embodiment shown in FIGS. 1 to 8, 17, 18a, 18b, 18c, 18d, 19a, 19b, 19c, 19d, 22, the base part has a holding part section which is cuboid in cross-section and in which the receptacle 5 is arranged. The connecting section 4 adjoins the cuboid holding section. In the embodiment shown in FIGS. 1 to 8, the holding part 3 is cuboid in shape. The holding part 3 has side walls 20. The spring arm 9 and the spring arm, at the end of which the first retaining lug 7 is formed, are implemented in the side walls 20. The holding part 3 also has a rear wall 21. Furthermore, the rectangular holding part 3 selected has an upper wall 22.

The spring arm 9 runs parallel to the first direction A and parallel to the second direction B. The first retaining lug 7 is designed at the end of a further spring arm 15 which runs parallel to the first direction A and parallel to the second direction B. The spring arm 9 is designed as a punching section in the side surface 20 of the holding part 3 and extends from a foot section at which the spring arm 9 merges into the parts surrounding it of the side surface 20 to a free end section provided for abutment with the wall 11. The further spring arm 15, on which the first retaining lug 7 is designed as a punching section in a side surface 20 of the holding part 3 and extends from a foot section at which the further spring arm 15 merges into the parts of the side surface surrounding it to a free end section. The end section is provided for engaging in the first latching recess 8. Relative to the arrangement in the direction of the second direction, the foot section of the first spring arm 9 is arranged in the region of the end section of the further spring arm 15, and the end section of the spring arm 9 is arranged in the region of the foot section of the further spring arm 15.

The holding part 3 has a recess 24 on its underside 23. In the delivery state, the recess 24 is in alignment with the receptacle 5. The bolt 14 to be connected to the connector 1 can be pushed through the recess 24 in the underside 23 through the holding part 3 into the receptacle 5 of the base part 2.

Furthermore, the lower side 23 of the holding part 2 has engagement tabs 25. If the holding part 3 is in the locking state, the engaging tabs 25 engage with a thread on the bolt 14 (see FIG. 8). The engagement tabs 25 thus prevent the holding part 3 and with the holding part 3 from being able to remove the base part 2 from the bolt 14.

In the embodiment shown in FIGS. 1 to 8, 17, 18a, 18b, 18c, 18d, 19a, 19b, 19c, 19d, 22, a structure detection surface 26 is provided on the component 2. In the delivery state (cf. FIGS. 1 to 5), the installation detection surface 26 is hidden by the holding part 3. In the locking state (see FIG. 6), the installation detection surface 26 is not hidden by the holding part 3.

On the upper wall 22, the holding part 3 has a window 27. In the locking state, the window 27 comes into alignment with the installation detection surface 26 so that the installation detection 26 in the locking state is not covered by the holding part 3.

In the embodiment shown in FIGS. 1 to 8, 17, 18a, 18b, 18c, 18d, 19a, 19b, 19c, 19d, 22, the base part 2 is a plastic part, while the holder part 3 is a metal part produced from a metal sheet section by means of bending and punching.

The cuboid shape of the holding part section and the cuboid shape of the holding part 3 form guide surfaces 28 on the base part 2, namely the outwardly pointing surfaces of the cuboid holding part section, which can come into contact with counter surfaces 29, namely the inwardly pointing surfaces of the cuboid holding part 3, so that in the relative movement of the holding part 3 relative to the base part 2, when the holding part 3 is moved from the delivery state to the locking state, the holding part 3 is guided by the contact of the mating surfaces 29 with the guide surfaces 28.

Figure 14:
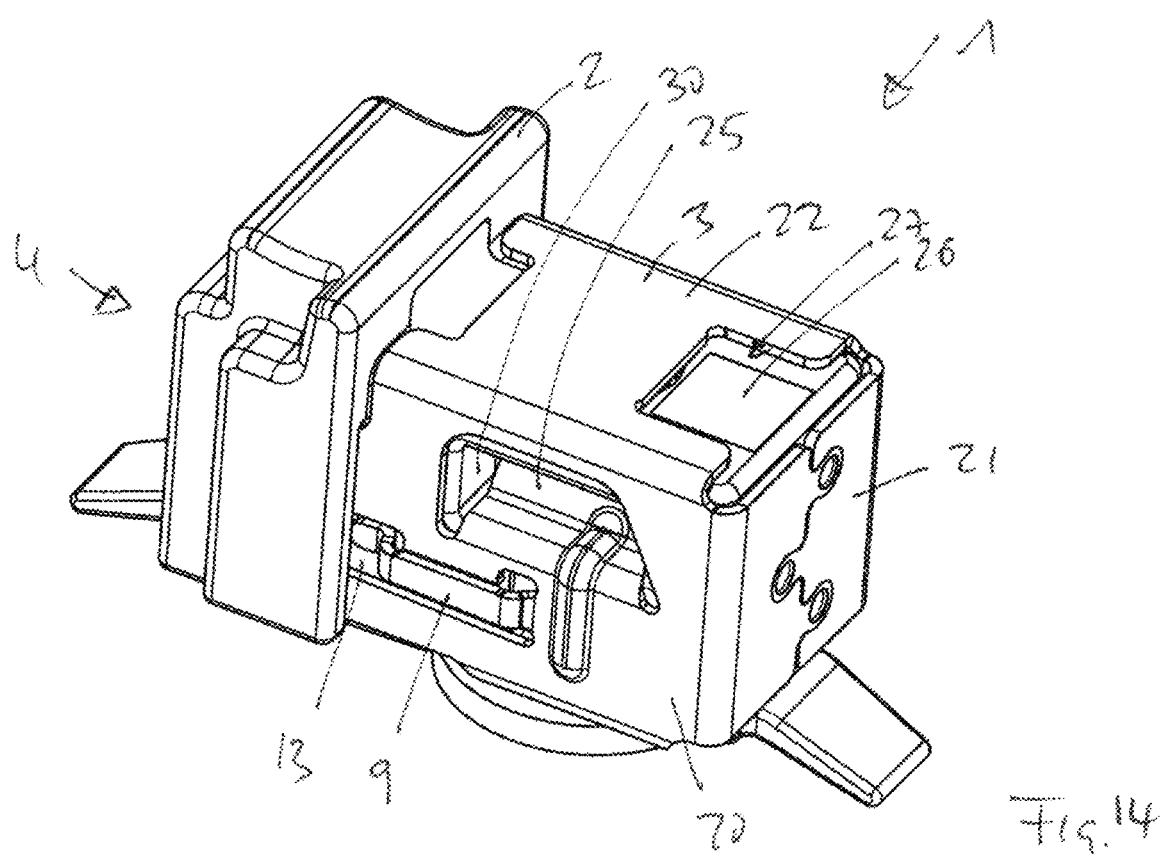
FIG. 14 shows a schematic, perspective view of the connector according to the invention according to FIG. 9 in the locking state.
Figure 15:
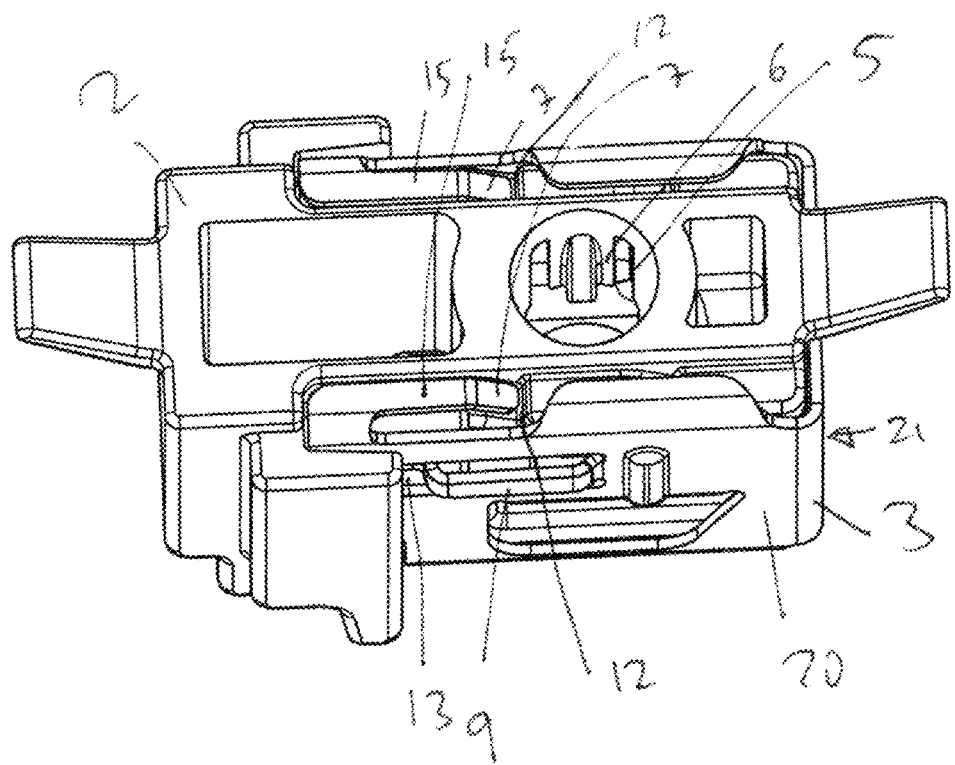
FIG. 15 shows a schematic, perspective bottom view of a detail of the connector according to FIG. 14.
Figure 16:
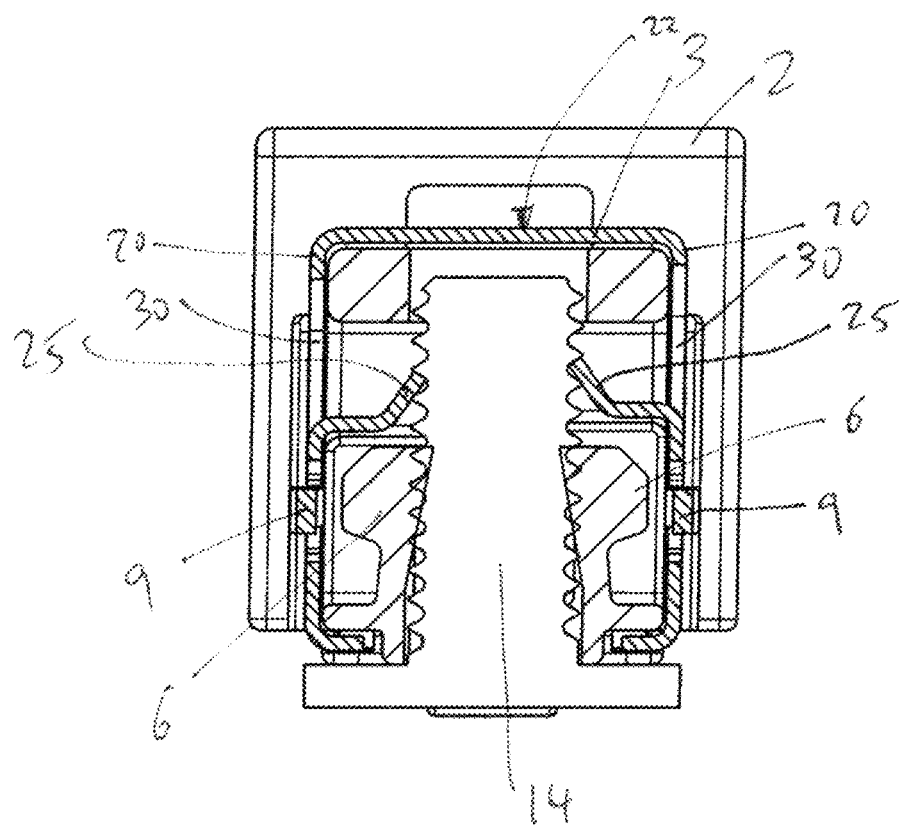
FIG. 16 shows a sectional view through the connector according to FIG. 14.
Figure 18A:
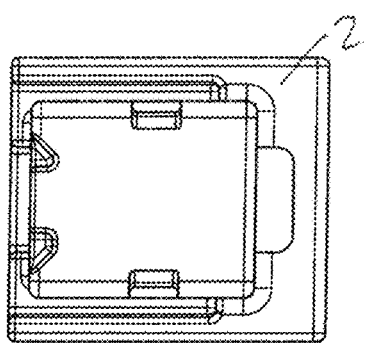
FIG. 18 a, b, c, d show schematic views of the base part of the connector according to FIG. 1, FIG. 19 a, b, c, d show schematic views of the holding part of the connector according to FIG. 1.
Figure 18B:
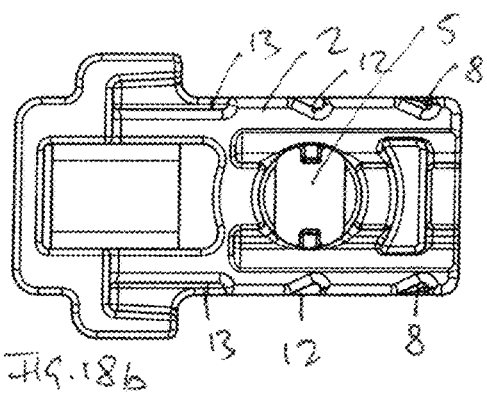
Figure 18C:
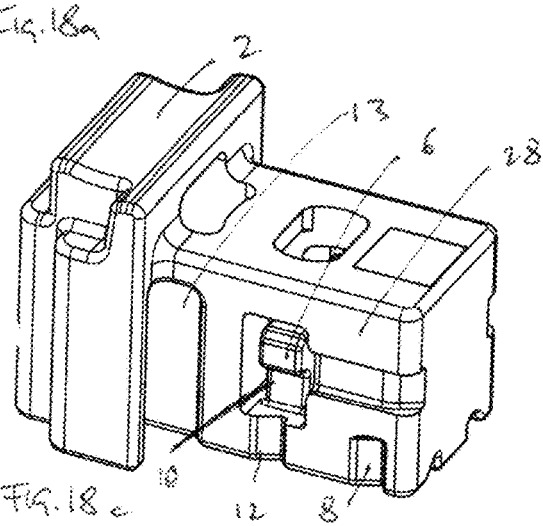
Figure 18D:
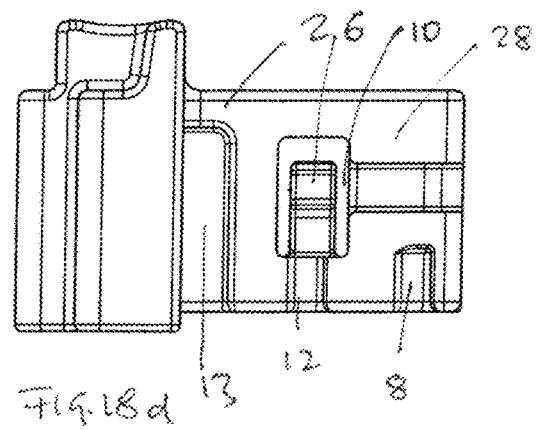
Figure 20A:
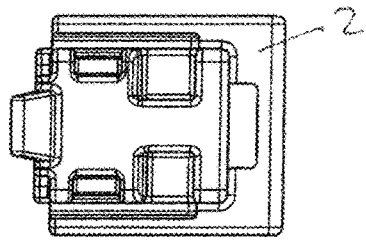
FIG. 20 a, b, c, d show schematic views of the base part of the connector according to FIG. 9.
Figure 20B:
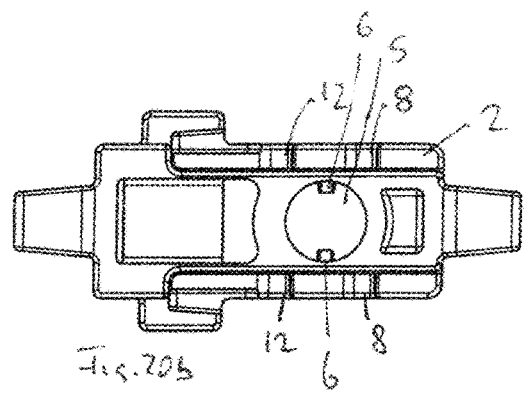
Figure 20C:
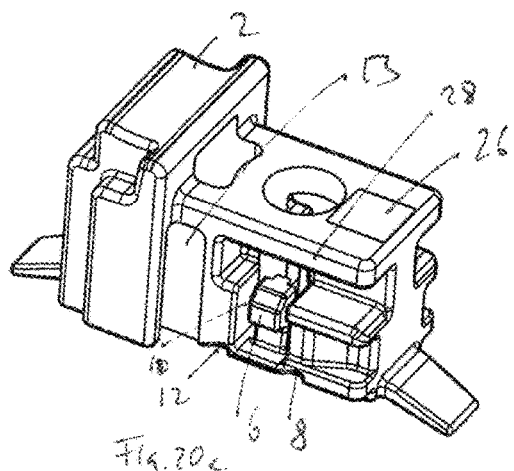
Figure 20D:
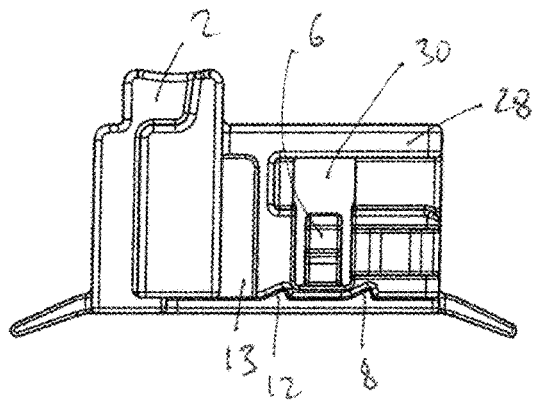

The second embodiment shown in FIGS. 9 to 16, 20a, 20b, 20c, 20d, 21a, 21b, 21c, 21d differs from the embodiment shown in FIGS. 1 to 8, 17, 18a, 18b, 18c, 18d, 19a, 19b, 19c, 19d, 22 in that the first retaining lug 7 is located on the underside 23 of the retaining part 3 and the first latching recess 8 and the second latching recess 12 are also formed on the underside of the base part 2. Furthermore, in the embodiment of FIGS. 9 to 16, 20a, 20b, 20c, 20d, 21a, 21b, 21c, 21d, a window 30 is provided in the base part 2 and leads from an outer surface of the base part 2 to the receptacle 5. The holding part 3 has an engagement tab 25 which, in the locking state (cf. FIG. 14, FIG. 16), passes through the window 30 and projects into the receptacle 5. There, the engagement tab 25 engages with an external thread on the bolt 14. The interaction of the engagement tab 25 with the external thread of the bolt 14 prevents the bolt 14 from being pulled out of the recess 5.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A connector for connecting a component to a bolt, wherein the connector is of multi-part design and has a base part and at least one holding part displaceably arranged on the base part, wherein the base part has a connecting section for connecting to the component, and the base part has a receptacle for receiving the bolt, wherein the base part has a clamping element which partially delimits the receptacle, wherein the clamping element assumes a first position in a delivery state of the connector in which the bolt has not yet been inserted into the receptacle and can be moved outward into a second position in a locking state of the connector, wherein the holding part has a first retaining lug which is arranged in a first latching recess of the base part in the delivery state or is arranged at a distance from the first latching recess of the base part in the delivery state, but can, however, be brought into the first latching recess of the base part by a relative movement in a first direction between the holding part and the base part, wherein the arrangement of the first retaining lug in the first latching recess blocks a relative movement between the holding part and the base part in the first direction, wherein the holding part has a spring arm, wherein the spring arm engages in a delivery recess of the base part in the delivery state or does not engage in the delivery recess of the base part in the delivery state, but, however, the delivery recess can be brought into engagement with the delivery recess by a relative movement in a second, opposite direction between the holding part and the base part, wherein the delivery recess has a wall and, if it engages with the delivery recess, the spring arm can come into contact with the wall and an abutment between the spring arm and the wall blocks a relative movement between the holding part and the base part in the second direction, wherein when moving from the first position to the second position from the inside, the clamping element comes into contact with the spring arm when the spring arm is in engagement with the delivery recess, and the spring arm is not in engagement with the delivery recess when the clamping element is in the second position.

2. The connector according to claim 1, wherein in order to achieve the locking state, the holding part must be moved in the direction of the second direction relative to the base part from the delivery state, wherein in the locking state:
the first retaining lug of the holding part is arranged in a second latching recess of the base part, wherein the arrangement of the first retaining lug in the second latching recess blocks a relative movement between the holding part and the base part in the first direction, or
a second retaining lug is provided on the holding part, which retaining lug is arranged in the second latching recess of the base part in the locking state, wherein the arrangement of the second retaining lug in the second latching recess blocks a relative movement between the holding part and the base part in the first direction.

3. The connector according to claim 1, wherein the base part has a window leading from an outer surface of the base part to the receptacle, and wherein the holding part has an engagement tab which, in the locking state, engages through the window and protrudes into the receptacle.

4. The connector according to claim 1, further comprising an installation detection surface on the base part, wherein the installation detection surface is covered by the holding part in the delivery state and is not covered by the holding part in the locking state.

5. The connector according to claim 1, wherein the base part is a plastic part and/or the holding part is a metal part.

6. The connector according to claim 1, wherein the base part has a holding part section which is cuboid in cross section and in which the receptacle is arranged, and/or which the holding part is cuboid.

7. The connector according to claim 1, wherein the base part has guide surfaces and wherein the holding part has mating surfaces which can come into contact with the guide surfaces, wherein in the relative movement of the holding part relative to the base part, when the holding part is moved from the delivery state to the locked state, the holding part is guided by the contact of the mating surface with the guide surface.

8. The connector according to claim 1, wherein the spring arm engages in a locking recess of the base part in the locking state.

9. A system comprising a bolt and a connector according claim 1, wherein the bolt is at least partially in the receptacle when the holding part is in the locking state.

10. A method for generating a system according to claim 9, wherein
a connector according to claim 1 is provided, wherein the spring arm engages with the delivery recess,
the bolt is inserted into the receptacle, wherein the insertion of the bolt into the receptacle causes the clamping element to be moved from the first position in the direction of the second position,
wherein the movement of the clamping element from the first position in the direction of the second position causes the clamping element to come into contact with the spring arm and, when the movement in the direction of the second position continues, presses the spring arm out of the delivery recess, and
the holding part is moved relative to the base part in the second direction when the spring arm has left the delivery recess.

* * * * *